United States Patent
Hung et al.

(10) Patent No.: US 10,343,097 B2
(45) Date of Patent: Jul. 9, 2019

(54) VENTILATION APPARATUS AND METHOD FOR FILTER DIRT DETECTION

(71) Applicant: DELTA ELECTRONICS, INC., Taoyuan County (TW)

(72) Inventors: Chen-Yu Hung, Taoyuan County (TW); Yuan-Ping Hsieh, Taoyuan County (TW); Chao-Hsien Chan, Taoyuan County (TW); Tung-Hung Shih, Taoyuan County (TW); Chih-Hsiang Chang, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 637 days.

(21) Appl. No.: 14/825,885

(22) Filed: Aug. 13, 2015

(65) Prior Publication Data

US 2016/0045854 A1 Feb. 18, 2016

Related U.S. Application Data

(60) Provisional application No. 62/038,076, filed on Aug. 15, 2014.

(51) Int. Cl.
*F24F 3/16* (2006.01)
*H04B 7/24* (2006.01)
(Continued)

(52) U.S. Cl.
CPC ........ *B01D 46/0086* (2013.01); *F24F 3/1603* (2013.01); *F24F 11/30* (2018.01);
(Continued)

(58) Field of Classification Search
None
See application file for complete search history.

(56) References Cited

U.S. PATENT DOCUMENTS

| 7,185,504 B2 | 3/2007 | Kasai et al. |
| 8,573,040 B2 | 11/2013 | Guzman et al. |

(Continued)

FOREIGN PATENT DOCUMENTS

| CN | 2499739 Y | 7/2002 |
| CN | 102016266 | 4/2011 |

(Continued)

OTHER PUBLICATIONS

Office Action dated Mar. 15, 2016 from corresponding application No. JP 2015-157422.

(Continued)

*Primary Examiner* — Duane Smith
*Assistant Examiner* — Brit E. Anbacht
(74) *Attorney, Agent, or Firm* — Hauptman Ham, LLP

(57) ABSTRACT

A ventilation apparatus includes a main body, an air entry and an air exit respectively arranged on two sides of the main body, a filter arranged behind the air entry, and a pressure sensor module located between the filter and the air exit, which senses pressure caused by air flowing inside the main body through the air entry and the filter. The pressure sensor module firstly senses pressure related data when the apparatus begins to start for initial data, and senses pressure related data continuously after the apparatus starts for working data, and transmits these data externally. An analysis monitor device computes a reference pressure offset value and a working pressure offset value according to the initial data and the working data, and compares the two pressure offset values for determining whether the filter needs to be replaced.

11 Claims, 5 Drawing Sheets

(51) Int. Cl.
  *B01D 46/00* (2006.01)
  *F24F 11/30* (2018.01)
  *F24F 11/39* (2018.01)
  *F24F 11/62* (2018.01)
  *F24F 11/79* (2018.01)
  *G05D 23/19* (2006.01)
  *H04L 12/28* (2006.01)
  *F24F 110/40* (2018.01)
  *F24F 120/10* (2018.01)
  *G05B 19/042* (2006.01)
  *G05B 19/048* (2006.01)

(52) U.S. Cl.
  CPC .............. *F24F 11/39* (2018.01); *F24F 11/62* (2018.01); *F24F 11/79* (2018.01); *G05B 19/042* (2013.01); *G05B 19/048* (2013.01); *G05B 19/0428* (2013.01); *G05D 23/1919* (2013.01); *H04B 7/24* (2013.01); *H04L 12/2827* (2013.01); *F24F 2110/40* (2018.01); *F24F 2120/10* (2018.01); *G05B 2219/2614* (2013.01); *Y02D 70/00* (2018.01); *Y02D 70/142* (2018.01); *Y02D 70/144* (2018.01); *Y02D 70/162* (2018.01); *Y02D 70/166* (2018.01); *Y02D 70/26* (2018.01); *Y02D 70/448* (2018.01); *Y02P 90/84* (2015.11)

(56) References Cited

U.S. PATENT DOCUMENTS

| | | | |
|---|---|---|---|
| 8,623,117 B2 | 1/2014 | Zavodny et al. | |
| 2004/0079094 A1 | 4/2004 | Kasai et al. | |
| 2010/0148748 A1* | 6/2010 | Bharadwaj | F24F 11/0086 324/71.1 |
| 2011/0021143 A1* | 1/2011 | Kapur | H04L 63/0464 455/41.2 |
| 2011/0094297 A1 | 4/2011 | Guzman et al. | |
| 2014/0260996 A1* | 9/2014 | Grider | B01D 46/0004 96/402 |
| 2015/0119071 A1* | 4/2015 | Basha | H04W 64/00 455/456.1 |
| 2015/0153317 A1* | 6/2015 | Krebs | G01N 33/0062 96/397 |
| 2015/0273381 A1* | 10/2015 | Stoner, Jr. | B01D 46/001 96/415 |
| 2015/0306533 A1* | 10/2015 | Matlin | B01D 46/448 96/420 |
| 2016/0037566 A1* | 2/2016 | Jakusovszky | H04W 8/005 455/41.2 |
| 2016/0048142 A1* | 2/2016 | Chan | F24F 11/0012 700/276 |
| 2017/0087500 A1* | 3/2017 | Combs | B01D 46/448 |

FOREIGN PATENT DOCUMENTS

| | | |
|---|---|---|
| JP | 2003-083590 | 3/2003 |
| JP | 2003-194389 | 7/2003 |
| JP | 2013-068415 | 4/2013 |

OTHER PUBLICATIONS

Office Action dated Aug. 14, 2017 from corresponding application No. TW 104121055.

Office Action dated Dec. 28, 2016 from corresponding application No. CN 201510372559.1.

* cited by examiner

VENTILATION APPARATUS AND METHOD FOR FILTER DIRT DETECTION

CROSS-REFERENCE TO RELATED APPLICATION

This patent application claims the benefit of U.S. Provisional Patent Application No. 62/038,076, filed Aug. 15, 2014, which is incorporated by reference herein.

TECHNICAL FIELD

The present invention relates to a ventilation apparatus and a method thereof and more particularly relates to a ventilation apparatus and a method thereof capable of detecting filter dirt.

BACKGROUND

Ventilation apparatuses like air conditioner or air clean machine usually are disposed with filters. Air is sucked into an internal space via an air entry and filtered with a filter before the air is sent outside via an air exit to achieve air circulation.

Usually, the filter becomes more and more dirty during usage because dirt and particles in the air are filtered and stay on the filter. Too much dirt of filters affects efficiency of circulation of ventilation apparatuses and further causes energy waste due to low efficiency. Therefore a user needs to replace filters of ventilation apparatus regularly.

Although manufacturers of ventilation apparatuses remind users with product specifications to regularly clean or replace filters, most users, however, forget to do such work, causing efficiency of ventilation apparatuses getting worse and worse while energy loss getting higher and higher.

Accordingly, current ventilation apparatuses usually are disposed with a timer to accumulate usage time of filters, i.e. operation time of ventilation apparatuses, and remind users with messages to clean or replace filters.

However, dirty levels of filters are greatly related to air condition. For example, when dirt amount is large in the air, the filters may be blocked in short time. But, in convention art, before the usage time reaches a predetermined value, such ventilation apparatus does not issue reminder messages and users are not aware of the need to replace filters. As such, before the usage time reaches the predetermined value, efficiency of such ventilation apparatus may drop significantly.

On the other hand, when dirt in the air is few, a filter may be still clean even reaching predetermined usage time. A reminder message of a ventilation apparatus in such case causes unnecessary waste.

SUMMARY

An objective of the present solution includes providing a ventilation apparatus with filter dirt detection and its detection method for sensing pressure offset values in a main body of the ventilation apparatus among different stages of usage to determine whether a filter needs to be replaced.

Another objective of the present solution includes providing a ventilation apparatus and its detection method by placing a pressure sensor module behind a filter to sense the pressure inside a main body of the ventilation apparatus respectively and by transmitting such data to outside to calculate necessary pressure offset values. As such, an external analysis monitor device determines whether the filter of ventilation apparatus needs to be replaced according to pressure offset values.

To achieve aforementioned objectives, an ventilation apparatus of an embodiment includes a main body, an air entry and an air exit disposed at two sides of the main body respectively, a filter disposed behind the air entry, and a pressure sensor module disposed between the filter and the air exit for sensing pressure caused by air flowing into the main body via the air entry and the filter.

The pressure sensor module firstly senses pressure related data as initial data when the ventilation apparatus is just enabled. The pressure sensor module then continuously senses pressure related data in the main body as working data after the ventilation apparatus is enabled. The initial data and the working data are transmitted to an analysis monitor device. The analysis monitor device calculates a reference pressure offset value according to the initial data and calculates a working pressure offset value according to the working data. The analysis monitor device further compares the working pressure offset value and the reference pressure offset value to determine dirty level of the filter of the ventilation apparatus.

Because filters may be blocked during usage of the ventilation apparatus and such blocking causes pressure change in the main body. Compared with convention art based on usage time, the present solution that determines whether a filter needs to be replaced or refreshed based on pressure offset values in the main body during different usage stages at least includes an advantage of obtaining a more accurate determination result.

Moreover, a wireless transmission pressure sensor module may be placed behind the filter to sense the pressure in the main body and to wirelessly transmit data externally so that users may easily know pressures in different ventilation apparatuses.

DETAILED DESCRIPTION

Preferred embodiments are explained as follows with accompanied drawings.

Figure 1:
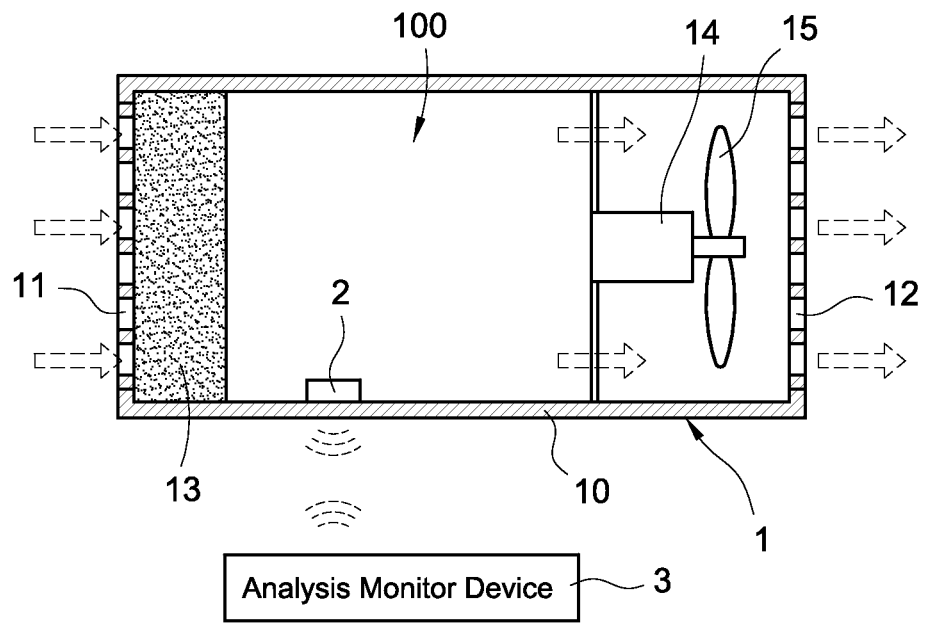
FIG. 1 is a structural diagram of a ventilation apparatus of a first embodiment.

Please refer to FIG. 1, which is a structural diagram of a ventilation apparatus of a first embodiment. Such ventilation apparatus is capable of detecting filter dirt, hereinafter as the ventilation apparatus, may be an air conditioner, an air clean machine, a heat exchange machine, a circulation machine, or any air related machines.

In FIG. 1, the ventilation apparatus 1 has a main body 10, a filter 13 disposed in the main body 10, a pressure sensor module 2, a motor 14 and a fan 15. Specifically, the main body 10 has an air channel 100 provided with an air entry 11 and an air exit 12. The air entry 11 is disposed in one side of the air channel 100 and the air exit 12 is disposed in the other side of the air channel 100. The filter 13 is disposed behind the air entry 11 and the pressure sensor module 2 is disposed between the filter 13 and the air exit 12.

The motor 14 is connected to the fan 15. When the ventilation apparatus 1 is enabled or started, the motor 14 starts to operate and drives the fan 15 to rotate. Meanwhile, external air is sucked into the air channel 100 of the main body 10 via the air entry 11 and the filter 13 and expelled outside the ventilation apparatus 1 via the air exit 12. After air is sucked into the ventilation apparatus 1, the air is firstly filtered by the filter 13 and dirt of the sucked air may stay on the filter 13. As such, expelled air from the air entry 12 of the ventilation apparatus 1 may be clean air.

The pressure sensor module 2 is mainly used for sensing the pressure in the main body 10. Before the ventilation apparatus 1 is enabled, the pressure sensor module 2 senses normal atmospheric pressure. When the ventilation apparatus 1 is enabled, external air is sucked into the main body 10 to increase the pressure in the main body 10. During usage of the ventilation apparatus 1, the performance of the filter 13 may be gradually decreased due to the filter 13 be blocked by the dirt of sucked air, affecting quality flowing into the main body 10 and gradually changing the pressure in the main body 10. Usually, when the ventilation apparatus 1 is enabled, the sensed pressure when the filter 13 is blocked is significantly larger than the sensed pressure when the filter 13 is clean, e.g. a new filter.

As mentioned above, a major technical feature includes using the pressure sensor module 2 to continuously sense the pressure in the main body 10 of the ventilation apparatus 1 and determining whether the filter needs to be replaced based on pressure offset values of different usage stages of the ventilation apparatus 1.

In this embodiment, the pressure sensor module 2 senses a static pressure value, near atmospheric pressure, in the main body 10 before the ventilation apparatus 1 is enabled. Next, when the ventilation apparatus 1 is just enabled, the pressure sensor module 2 senses an initial pressure value in the main body 10. Specifically, the pressure sensor module 2 uses a pressure value firstly sensed as the initial pressure value after the ventilation apparatus 1 is just enabled, i.e. the motor starting to operate. In addition, after the ventilation apparatus 1 is enabled, the pressure sensor module 10 continuously senses the pressure value in the main body 10 as a working pressure value. When the ventilation apparatus 1 is used for longer time, i.e. the filter getting more dirty, the working pressure value becomes larger.

The static pressure value and the initial pressure value are used for calculating a reference pressure offset value. The static pressure value and the working pressure value are used for calculating a working pressure offset value. In this solution, the filter 13 is determined whether necessary to be replaced by checking whether an offset value between the reference pressure offset value and the working pressure offset value falls within a predetermined pressure offset range. When such condition is found, a warning message related to the filter 13 is issued to remind users to clean or replace the filter 13.

In this embodiment, the ventilation apparatus 1 may further comprise an analysis monitor device 3 wirelessly connected to the pressure sensor module 2. The analysis monitor device 3 wirelessly receives the static pressure value, the initial pressure value and the working pressure value of the pressure sensor module 2. Further, the analysis monitor device 3 calculates the reference pressure offset value according to the static pressure value and the initial pressure value and calculates the working pressure offset value according to the static pressure value and the working pressure value. The analysis monitor device 3 compares the reference pressure offset value and the working pressure offset value to obtain the offset value. Further, when the offset value falls within the predetermined pressure offset range, the filter 13 is determined necessary to be replaced and the warning message is issued. Please be noted that the predetermined pressure offset range may be internally built in the analysis monitor device 3 or configured by users. Such details do not limit the invention scopes.

Figure 2:
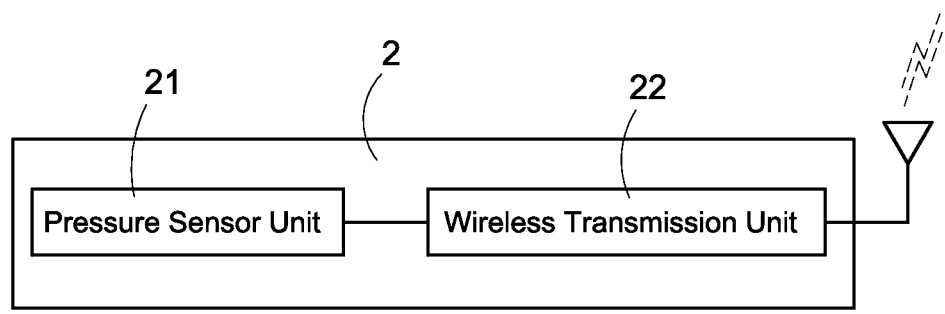
FIG. 2 is a block diagram of a pressure sensor module of the first embodiment.

Please also refer to FIG. 2, which is a pressure sensor module block diagram of the first embodiment. In FIG. 2, the pressure sensor module 2 mainly includes a pressure sensor unit 21 and a wireless transmission unit 22 connected to the pressure sensor unit 21. The pressure sensor unit 21 is used for sensing the static pressure value, the initial pressure value and the working pressure value. The wireless transmission unit 22 is used for transmitting the static pressure value, the initial pressure value and the working pressure value externally.

In this embodiment, the wireless transmission unit 22 may be a Wireless Fidelity (Wi-Fi) transmission unit. The analysis monitor device 3 may be a smart mobile device, a central server located where the ventilation apparatus 1 resides, or a cloud server at cloud end that is wirelessly connected to the pressure sensor module 2 via Wi-Fi transmission like Wi-Fi Direct Transmission or transmission via routers. Alternatively, the wireless transmission unit 22 may be a Radio Frequency (RF) transmission unit or a Near Field Communication (NFC) transmission unit. The analysis monitor device 3 may be a smart mobile device or a central server that is wirelessly connected to the pressure sensor module 2 via RF transmission or NFC transmission.

In this embodiment, the pressure sensor module 2 uses only the pressure sensor unit 21 to sense the pressure values and uses the wireless transmission unit 22 to transmit the sensed pressure values externally, and no processing unit for calculating pressure offset values is disposed. Therefore, by applying Micro Electro Mechanical Systems (MEMS) technology, the pressure sensor module 2 may be miniaturized to be replaced in the main body 10 while occupying only little space in the main body 10.

Generally, when a manufacturer manufactures the ventilation apparatus 1, the pressure sensor module 2 is disposed behind the filter 13. Alternatively, in other embodiments, users may purchase the pressure sensor module 2 and install the pressure sensor module 2 behind the filter of an existed ventilation apparatus to use the pressure sensor module 2 to have the filter dirt detection function as mentioned above.

In another embodiment, the wireless transmission unit 22 may be a Bluetooth Low Energy (BLE) transmission unit, and the analysis monitor device 3 may a smart mobile device that supports BLE transmission. Because BLE transmission consumes low power, a button cell battery may support the pressure sensor module 2 to operate for about one year. In other words, a user may purchase such pressure sensor module 2 and places the pressure sensor module 2 behind a filter of his ventilation apparatus. Only after one or one and half year later, the user does not need to worry about battery and it is very convenient. As such, users do not need to replace new model of ventilation apparatus 1 but still are able to use the filter dirt detection method. This helps promotion of this method.

Figure 3:
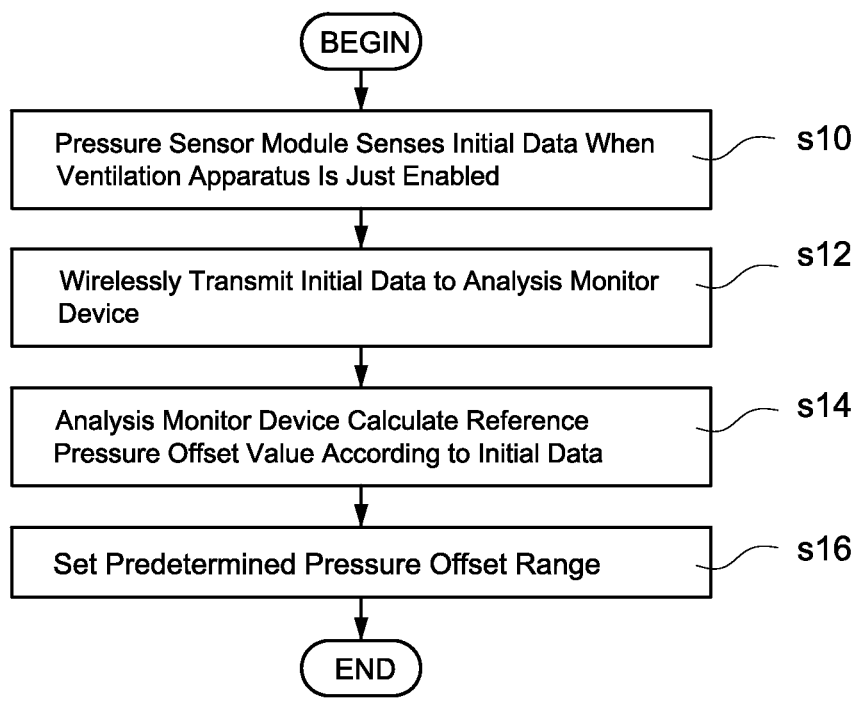
FIG. 3 is a flowchart for obtaining reference pressure offset values of the first embodiment.

Please refer to FIG. 3, which is a flowchart for creating the reference pressure offset values of the first embodiment. By using the filter dirt detection method, a user acquires a ventilation apparatus with the pressure sensor module 2 or acquires the pressure sensor module 2 to be disposed behind the filter 13 in his ventilation apparatus 1.

The pressure sensor module 2 senses the pressure related data in the main body 10 as initial data when the ventilation apparatus is just started (step S10) and wirelessly transmits the initial data to the analysis monitor device 3 (step S12). Specifically, the pressure sensor module 2 senses the static pressure value in the main body 10 before the ventilation apparatus 1 is enabled and takes the first sensed pressure value as the initial pressure value when the ventilation apparatus 1 is just enabled. The static pressure value and the initial pressure value are used as the initial data. Furthermore, in step S12, the pressure sensor module 2 wirelessly transmits the static pressure value and the initial pressure value to the analysis monitor device 3.

After the step S12, the analysis monitor device 3 wirelessly receives the initial data and calculates the reference pressure offset value according to the initial data (step S14). Specifically, the analysis monitor device 3 uses the pressure sensor module 2 to wirelessly receive the static pressure value and the initial pressure value and calculates the reference pressure offset value according to the static pressure value and the initial pressure value. Further, the analysis monitor device 3 may store the reference pressure offset value.

In this embodiment, the analysis monitor device 3 may also set the predetermined pressure offset range (step S16) via external operation and uses the predetermined pressure offset range and the reference pressure offset value together to determine whether necessary to replace the filter 13. However, in other embodiments, the predetermined pressure offset range may be set in advance by the analysis monitor device 3. Alternatively, the analysis monitor device 3 may calculate and generate the predetermined pressure offset range according to the reference pressure offset value. Other variations may also be applied.

Figure 4:
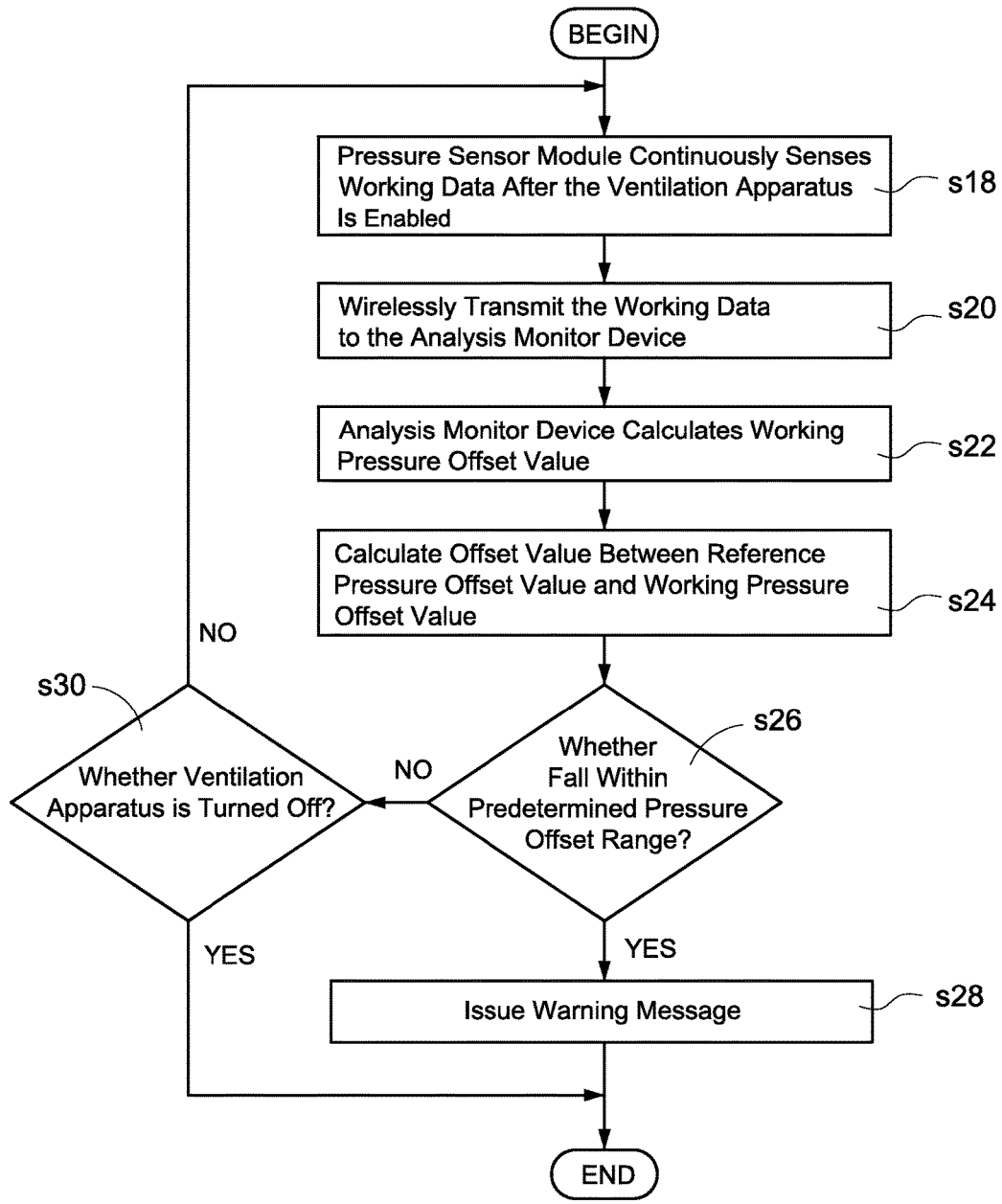
FIG. 4 is a filter dirt detection flowchart of the first embodiment.

Please refer to FIG. 4, which is a flowchart of filter dirt detection of the first embodiment. After the ventilation apparatus 1 is enabled, i.e. the reference pressure offset value having be created, the pressure sensor module 2 may continuously sense pressure related data in the main body 10 as working data (step S18) and the working data are wirelessly transmitted to the analysis monitor device 3 (step S20).

Specifically, the pressure sensor module 2 continuously sense the working pressure value in the main body 10 after the ventilation apparatus 1 is enabled. The working pressure value is used as the working data and transmitted to the analysis monitor device 3.

After the step S20, the analysis monitor device 3 may receive the working data and calculate the working pressure offset value according to the working data (step S22). Specifically, the analysis monitor device 3 wirelessly receives the working pressure value via the pressure sensor module 2 and calculates the working pressure offset value according to the working pressure value and previously received static pressure value.

After the working pressure offset value is calculated, the analysis monitor device 3 further calculates an offset value between the reference pressure offset value and the working pressure offset value (step S24) and determines whether the offset value falls within the predetermined pressure offset range (step S26). When the offset value falls within the predetermined pressure offset range, the analysis monitor device 3 generates and issues the warning message related to the filter 13 (step S28). If the offset value does not fall within the predetermined pressure offset range, it is further determined whether the ventilation apparatus 1 is turned off (step S30). Further, before the ventilation apparatus 1 is turned off, the step S18 to S26 are repeated to continuously determine whether the filter 13 is necessary to be replaced.

Please be noted that if the analysis monitor device 3 is a central server or a cloud server, the analysis monitor device 3 may transmit the warning message to a personal device of a user via short messages, APP push messages or e-mails. Alternatively, such warning messages may be transmitted to the ventilation apparatus 1 and displayed by the ventilation apparatus 1 like to generate a reminder sound or trigger warning lights to blink. Furthermore, if the analysis monitor device 3 is a smart mobile device that uses a corresponding APP to the pressure sensor module 2 to calculate the reference pressure offset value and the working pressure offset value, the analysis monitor device 3 may display the warning message directly. The warning messages may be text, pictures, films, sounds or any other presentation that remind users to clean or replace the filter 13.

Figure 5:
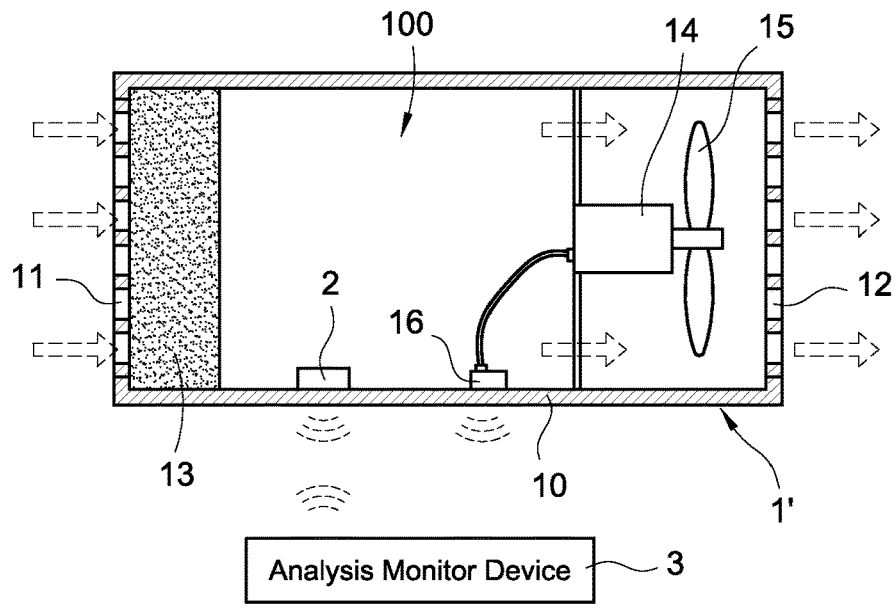
FIG. 5 is a structural diagram of a ventilation apparatus of a second embodiment.

Please refer to FIG. 5, which is a structural diagram of a ventilation apparatus of a second embodiment. In the embodiment, another ventilation apparatus 1' is disclosed. The difference between the ventilation apparatus 1' and the aforementioned ventilation apparatus 1 includes that that the ventilation apparatus 1' further includes a motor 14 and a motor sensor module 16 connected to the motor 14. The motor sensor module 16 is used for sensing a motor rotation speed of the motor 14 and for generating corresponding rotation speed data to transmit the rotation speed data wirelessly to the analysis monitor device 3. In this embodiment, the motor sensor module 16 may be incorporated with the pressure sensor module 2, or disposed separately from the pressure sensor module 2. The motor sensor module 16 may be wirelessly connected to the analysis monitor device 3 via Wi-Fi transmission, RF transmission, NFC transmission, BLE transmission or other communication methods.

Generally, the ventilation apparatus 1 has an air flow amount adjustment function. Specifically, the motor rotation speed is adjusted to adjust output air flow amount of the ventilation apparatus 1. For example, when the motor 14 stops rotation, the air flow amount is 0. When the motor 14 is operated at a first rotation speed, the air flow amount is at low air flow amount. When the motor 14 is operated at a second rotation speed, the air flow amount is at a middle air flow amount. When the motor 14 is operated at a third rotation speed, the air flow amount is at high air flow amount. The third rotation speed is larger than the second rotation speed and the second rotation speed is larger than the first rotation speed.

In the embodiment, the motor sensor module 16 is used for sensing the motor rotation speed and for creating multiple reference pressure offset values and multiple predetermined pressure offset ranges according to multiple motor rotation speed values. An example is illustrated as follows:

TABLE 1

| Air Flow Amount | Reference Pressure Offset Value(Pa) | Predetermined Pressure Offset Range(Pa) |
| --- | --- | --- |
| 0 | | |
| High | 60 | 70~75 |
| Middle | 30 | 40~45 |
| Low | 10 | 15~20 |

In this embodiment, when the ventilation apparatus 1 is just enabled, the motor 14 is controlled to operate at a first rotation speed, i.e. low air flow amount, and a first record of the initial pressure value is sensed. Next, the motor 14 is switched to the second rotation speed, i.e. middle air flow amount, and a second record of the initial pressure value is sensed. Finally, the motor 14 is switched to the third rotation speed, i.e. high air flow amount, and a third record of the initial pressure value is sensed. As such, after the analysis monitor device 3 receives the static pressure value and the initial pressure values, a first record of the reference pressure offset value, e.g. 10 Pa, corresponding to the first rotation speed, a second record of the reference pressure offset value, e.g. 30 Pa, corresponding to the second rotation speed, and a third reference pressure offset value, e.g. 60 Pa, corresponding to the third rotation speed are respectively created.

As mentioned above, the analysis monitor device 3 may further set a first predetermined pressure offset range, e.g. 15 Pa to 20 Pa, corresponding to the first rotation speed, a second predetermined pressure offset range, e.g. 40 Pa to 45 Pa, corresponding to the second rotation speed, and a third predetermined pressure offset range, e.g. 70 Pa to 75 Pa, corresponding to the third rotation speed.

As such, when the analysis monitor device 3 receives the working pressure value and calculates the working pressure offset value, the reference pressure offset value and the corresponding predetermined pressure offset range corresponding to the received rotation speed data are obtained. When an offset value between the working pressure offset value and its corresponding reference pressure offset value falls within the corresponding predetermined pressure offset range, the warning message is generated. In this solution, the motor sensor module 16 is used for detecting the rotation speed of the motor 14 and creates multiple reference pressure offset values and multiple predetermined pressure offset ranges to enhance the sensing method more accurate.

Please be noted that the motor sensor module 16 may also record an operation time of the motor 14, i.e. enabling time of the ventilation apparatus 1, and determine whether the filter 13 needs to be replaced according to the operation time simultaneously. As such, the present solution determines dirty level of the filter 13 with both operation time and the pressure offset value to make the sensed result more accurate.

In addition, the motor sensor module 16 may also detect a loading of the motor 14. Usually, when the filter 13 is clean, the motor 14 has a smaller loading, and when the filter 13 is blocked, the motor 14 has a larger loading. As such, the present invention may determine the dirty level based on the motor loading and the pressure offset value, or based on motor loading, operation time and the pressure offset value to make the sensing result more accurate. However, these examples are just preferred embodiments, not limitation for the invention scopes.

Figure 6:
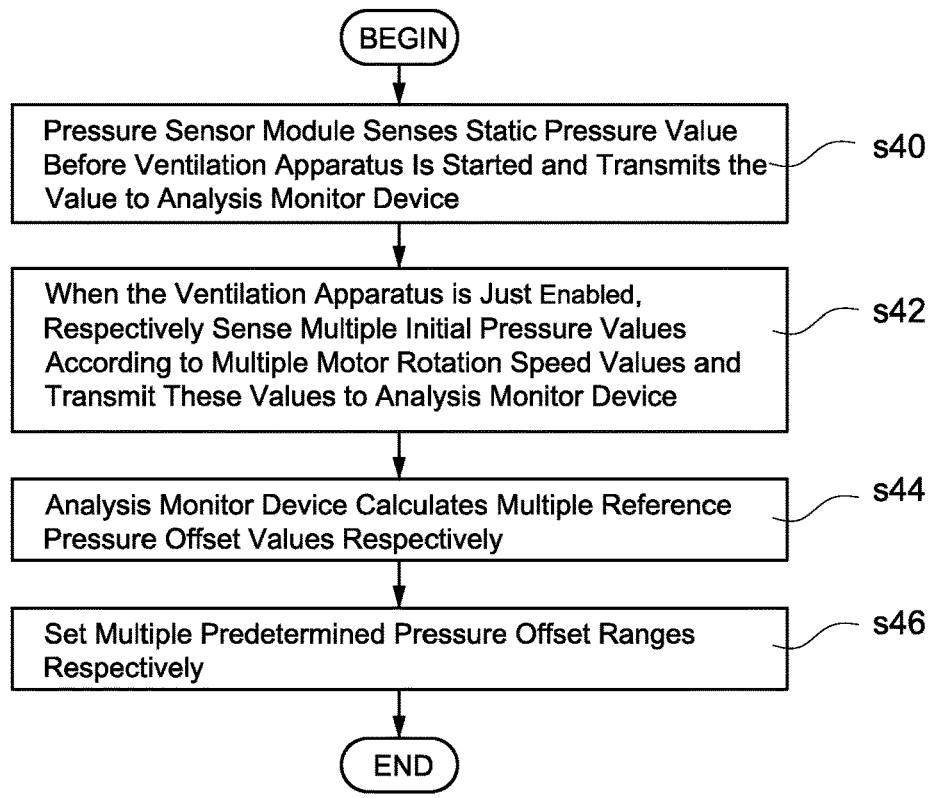
FIG. 6 is a flowchart for obtaining reference pressure offset values of the second embodiment.
Figure 7:
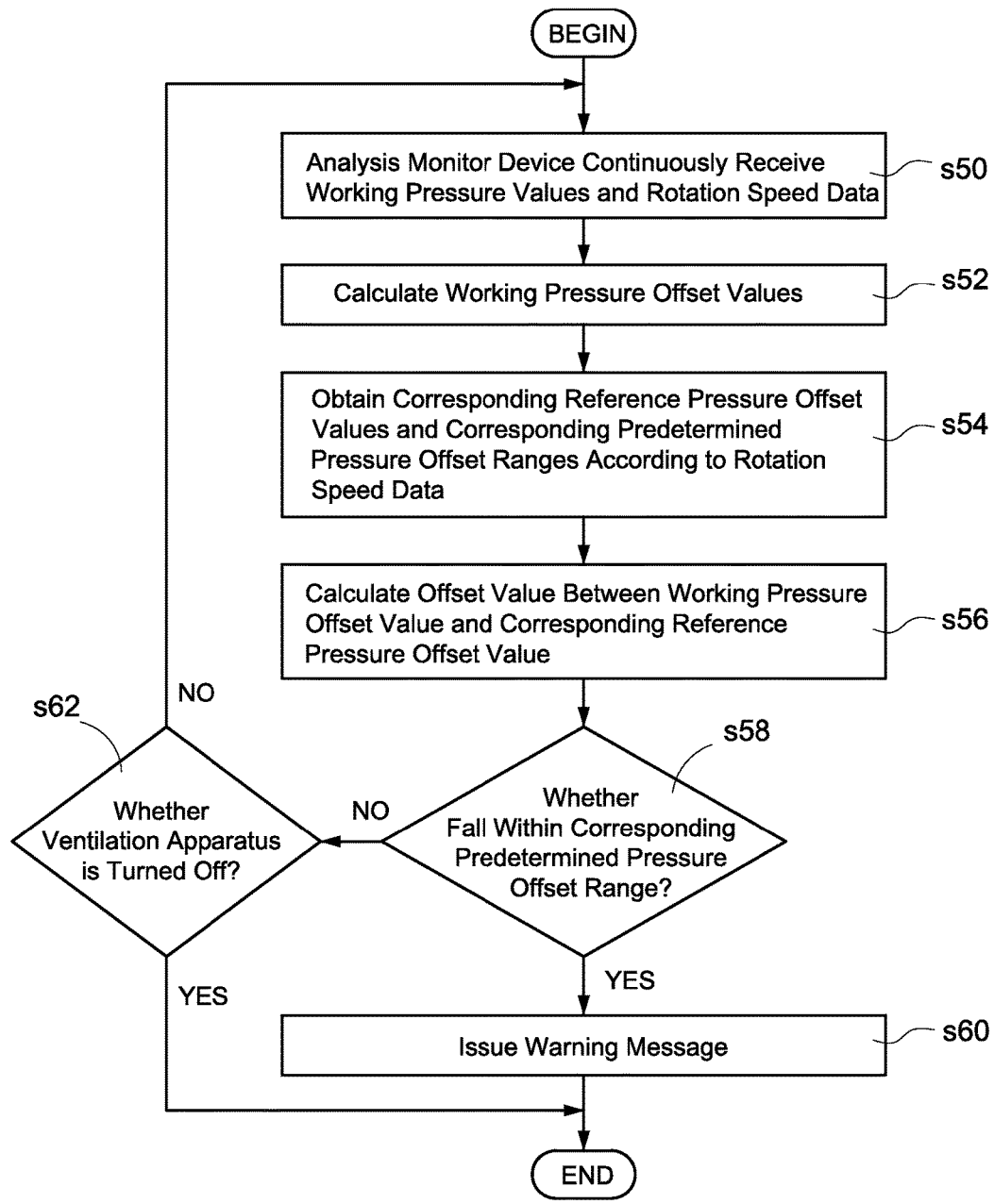
FIG. 7 is a filter dirt detection flowchart of the second embodiment.

Please refer to FIG. 6 and FIG. 7, which are a flowchart for creating the reference pressure offset values and a flowchart for detecting filter dirt of the second embodiment. FIG. 6 and FIG. 7 are applied to the ventilation apparatus 1 of FIG. 5 as an example. In this embodiment, the pressure sensor module 2 senses the static pressure value before the ventilation apparatus 1' is enabled and transmits the value to the analysis monitor device 3 (step S40). Next, when the ventilation apparatus 1' is just enabled, multiple initial pressure values are respectively sensed according to multiple motor rotation speed values and these values are respectively transmitted to the analysis monitor device 3 (step S42). For example, when the motor 14 is enabled and operated in the first rotation speed, the second rotation speed and the third rotation speed, the pressure sensor module 2 respectively senses the first initial pressure value, the second initial pressure value and the third initial pressure value, and these values are transmitted to the analysis monitor device 3. In this embodiment, the motor rotation speed may be switched automatically when the ventilation apparatus 1' is enabled or switched by users. Other variations are still covered by the invention scopes.

The analysis monitor device 3 respectively receive multiple initial pressure values and respectively calculate multiple reference pressure offset values according to the static pressure values and the multiple initial pressure values (step S44). Each reference pressure offset value corresponds to an associated motor rotation speed. In addition, the analysis monitor device 3 respectively sets multiple predetermined pressure offset ranges (step S46) and each predetermined pressure offset range corresponds to one motor rotation speed.

In FIG. 7, the analysis monitor device 3 continuously receives the working pressure value and the rotation data from the pressure sensor module 2 and the motor sensor module 16 (step S50). The analysis monitor device 3 calculates the working pressure offset value according to the working pressure value (step S52). The analysis monitor device 3 receives the reference pressure offset value and corresponding predetermined pressure offset range according to the rotation speed data (step S54). Next, the analysis monitor device 3 calculates an offset value between the working pressure offset value and the corresponding reference pressure offset value (step S56) and determines whether the offset value falls within the corresponding predetermined pressure offset range (step S58).

When the offset value falls within the predetermined pressure offset range, the analysis monitor device 3 issues the warning message (step S60). When the offset value does not fall within corresponding predetermined pressure range, the ventilation apparatus 1' is further determined being turned off (step S62). Before the ventilation apparatus 1' is turned off, the steps S50 to S58 are executed repeatedly to continuously determine whether the filter 13 is necessary to be replaced.

Please be noted that if the analysis monitor 3 has multiple ventilation apparatuses disposed around the analysis monitor device 3, i.e. there being multiple sensor modules 2, the analysis monitor device 3 may receive pressure related data, motor rotation speed data, operation time and loading of the multiple ventilation apparatuses 1 and 1'. As such the analysis monitor device 3 efficiently manage amount, maintenance time and filter replacement time and replacement amount of all ventilation apparatuses 1 and 1' within its managing range. Such design is very convenient for users.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A ventilation apparatus with filter dirt detection, comprising:
    a main body comprising an air entry and an air exit at two sides of the main body respectively;

a filter behind the air entry for filtering air flowing into the main body via the air entry and the filter;
a fan;
a motor connected to the fan, the motor being configured to operate under different motor rotation speeds such that the fan is caused to rotate;
a motor sensor module connected to the motor, the motor sensor module being configured to sense a current motor rotation speed of the motor and to generate corresponding rotation speed data;
a pressure sensor module between the filter and the air exit, the pressure sensor module being configured to:
 sense a static pressure value of the main body before enabling the ventilation apparatus;
 sense multiple initial pressure values of the main body respectively corresponding to each of the motor rotation speeds when the ventilation apparatus is just enabled; and
 continuously sense a working pressure value of the main body after the ventilation apparatus is enabled; and
an analysis monitor device configured to:
 wirelessly receive the static pressure value, the multiple initial pressure values, the working pressure value and the rotation speed data;
 calculate multiple reference pressure offset values, based on the static pressure value and the multiple initial pressure values, and respectively corresponding to each of the motor rotation speeds;
 calculate a working pressure offset value based on the static pressure and the working pressure;
 identify a predetermined pressure offset range based on the rotation speed data;
 identify a corresponding one of the multiple reference pressure offset values based on the rotation speed data;
 calculate an operating status offset value between the corresponding one of the multiple reference pressure offset values and the working pressure offset value; and
 generate a warning message related to the filter if the operating status offset value is within the predetermined pressure offset range.

2. The ventilation apparatus of claim 1, wherein the pressure sensor module comprises a pressure sensor unit and a wireless transmission unit connected to the pressure sensor unit, the pressure sensor unit is configured to detect the static pressure value, the initial pressure value and the working pressure value, the wireless transmission unit is configured to transmit the static pressure value, the initial pressure value and the working pressure value to the analysis monitor device.

3. The ventilation apparatus of claim 2, wherein the wireless transmission unit is a Wireless Fidelity (Wi-Fi) transmission unit, a Radio Frequency (RF) transmission unit, or a Near Field Communication (NFC) transmission unit.

4. The ventilation apparatus of claim 2, wherein the wireless transmission unit is a Bluetooth low energy (BLE) transmission unit.

5. A ventilation apparatus with filter dirt detection, comprising:
a main body with an air entry and an air exit at two sides of the main body respectively;
a filter behind the air entry for filtering air flowing into the main body from the air entry and the filter;
a fan;
a motor connected to the fan, the motor being configured to operate under different motor rotation speeds such that the fan is caused to rotate;
a motor sensor module connected to the motor, the motor sensor being configured to sense a current motor rotation speed of the motor and to generate corresponding rotation speed data; and
a pressure sensor module between the filter and the air exit, the pressure sensor module being configured to:
 sense a static pressure value of the main body before the ventilation apparatus is enabled;
 sense multiple initial pressure values of the main body respectively corresponding to each of the motor rotation speeds when the ventilation apparatus is just enabled; and
 continuously sense a working pressure value of the main body after the ventilation apparatus is enabled; and
an analysis monitor device wirelessly connected to the pressure sensor module, the analysis monitor device being configured to:
 receive the static pressure value, the multiple initial pressure values, the working pressure value and the rotation speed data;
 calculate multiple reference pressure offset values respectively corresponding to each of the motor rotation speeds according to the static pressure value and the multiple initial pressure values;
 calculate a working pressure offset value according to the static pressure value and the working pressure value;
 obtain a corresponding one of the multiple reference pressure offset values and a corresponding predetermined pressure offset range according to the rotation speed data; and
 issue a warning message related to the filter based on a determination that an offset value between the obtained corresponding reference pressure offset value and the working pressure offset value falls within the corresponding predetermined pressure offset range.

6. The ventilation apparatus of claim 5, wherein the pressure sensor module comprises a pressure sensor unit and a wireless transmission unit connected to the pressure sensor unit, the pressure sensor unit is configured to detect the static pressure value, the initial pressure value and the working pressure value, and the wireless transmission unit is configured to transmit the static pressure value, the initial pressure value and the working pressure value to the analysis monitor device.

7. The ventilation apparatus of claim 6, wherein the wireless transmission unit is a Wi-Fi transmission unit, a RF transmission unit or a NFC transmission unit, and the analysis monitor device is a smart mobile device, a central server or a cloud server supporting Wi-Fi transmission, RF transmission or NFC transmission.

8. The ventilation apparatus of claim 6, wherein the wireless transmission unit is a BLE transmission unit, the analysis monitor device is a smart mobile device or a central server supporting BLE transmission.

9. A method for filter dirt detection method for a ventilation apparatus, the ventilation apparatus comprising a main body, an air entry and an air exit disposed at two sides of the main body respectively, a filter disposed behind the air entry, a pressure sensor module disposed between the filter and the air exit, a fan, a motor sensor module connected to the motor for sensing current motor rotation speed of the motor and generating corresponding rotation speed data, and an analysis monitor device wirelessly connected to the pressure sensor module, the filter dirt detection method comprising:

a) sensing pressure related data in the main body as multiple initial data when the ventilation apparatus just being enabled, comprising:
   a1) sensing a static pressure value in the main body before the ventilation apparatus being enabled; and
   a2) controlling the motor to operate under different motor rotation speeds and controlling the pressure sensor module to sense multiple initial pressures values of the main body respectively corresponding to each of the motor rotation speeds when the ventilation apparatus just being enabled, wherein the multiple initial data respectively comprise the static pressure value and one of the multiple initial pressure values;
b) wirelessly transmitting the multiple initial data to the analysis monitor device;
c) the analysis monitor device respectively calculating multiple reference pressure offset values respectively corresponding to each of the motor rotation speeds according to the multiple initial data after the step b);
d) the pressure sensor module continuously sensing pressure related data in the main body as working data after the ventilation apparatus is enabled;
e) wirelessly transmitting the working data to the analysis monitor device;
f) the analysis monitor device calculating a working pressure offset value according to the working data after the step e);
g) obtaining a corresponding one of the multiple reference pressure offset values and a corresponding predetermined pressure offset range according to the rotation speed data; and
h) the analysis monitor device determining whether to issue a warning message relate to the filter according to whether an offset value between the obtained corresponding reference pressure offset value and the working pressure offset value falls within the predetermined pressure offset range.

10. The filter dirt detection method of claim 9, wherein the step d) is continuously sensing a working pressure value in the main body after the ventilation apparatus is started, and the step f) is calculating the working pressure offset value according to the static pressure value and the working pressure value.

11. The filter dirt detection method of claim 10, wherein the pressure sensor module and the motor sensor module connect to the analysis monitor device via BLE transmission respectively.

* * * * *